Figure 1:
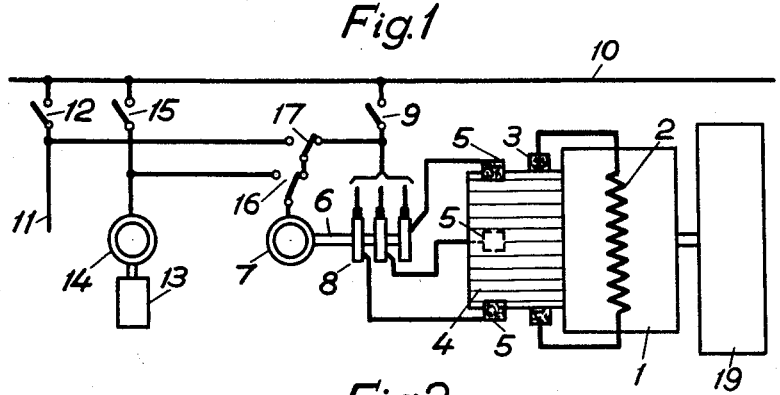

Jan. 26, 1960     R. E. H. ÖHLUND     2,922,896
INSTANTANEOUS RESERVE AGGREGATES FOR
TELE-COMMUNICATION PLANTS

Filed Feb. 28, 1957     2 Sheets-Sheet 1

INVENTOR.
Rolf Eri Holger Öhlund
BY
Attorney.

Jan. 26, 1960 R. E. H. ÖHLUND 2,922,896
INSTANTANEOUS RESERVE AGGREGATES FOR
TELE-COMMUNICATION PLANTS
Filed Feb. 28, 1957 2 Sheets-Sheet 2

INVENTOR.
Rolf Eri Holger Öhlund
BY
Attorney.

United States Patent Office 2,922,896
Patented Jan. 26, 1960

2,922,896
INSTANTANEOUS RESERVE AGGREGATES FOR TELECOMMUNICATION PLANTS

Rolf Eri Holger Öhlund, Vasteras, Sweden, assignor to Allmänna Svenska Elektriska Aktiebolaget, Vasteras, Sweden, a corporation of Sweden Application February 28, 1957, Serial No. 643,119

Claims priority, application Sweden November 3, 1954

14 Claims. (Cl. 307—68)

The present application is a continuation-in-part of application, Serial No. 543,221 filed on October 27, 1955, now abandoned for improvements in "Instantaneous Reserve Aggregate for Tele-Communication Plants."

In most tele-communication plants the permanent supply of driving current is an indispensable condition, and very short interruptions in the delivery of current cannot be allowed. Such plants are generally driven from an alternating current network, and the emergency energy is then delivered from a stand-by electric aggregate generally driven by a diesel motor. As mentioned above it is necessary to avoid every interruption in the delivery of driving current, but as the starting of such a stand-by electric aggregate requires a certain, although short time, it has hitherto been necessary to provide the plant with an instantaneously acting energy supplier taking over the delivery of energy until the stand-by aggregate has started. For this purpose hitherto storage batteries have been used to a very large extent, but they are avoided, if possible, and instead it has been proposed to use a generator provided with a fly wheel as an intsantaneously acting stand-by aggregate. Such instantaneously acting standby aggregates which must be running permanently are, however, combined with the disadvantage that they, also when running idle, consume a considerable amount of energy.

The present invention concerns a permanently rotating instantaneous stand-by aggregate having a considerably reduced consumption of energy and is chiefly characterized in that it consists of an electric machine having a direct current wound armature and an excitation winding which is connected to the commutator of the machine over stationary brushes. The machine is further provided with a set of brushes sliding against the commutator, which brushes by a specal driving device are brought to rotate in relation to the commutator. The machine is permanently connected to the load and normally also connected to and driven from an alternating current network. In one form of the invention the network as well as the load are connected to the machine through the rotating brushes. In another form of the invention the machine is provided with slip rings permanently connected to the armature winding and the network is connected to said slip rings, whereas the load is connected to the rotating brushes. In still another form of the invention the load is connected to the slip rings, mentioned above, and the network is connected to the rotating brushes.

Figure 2:
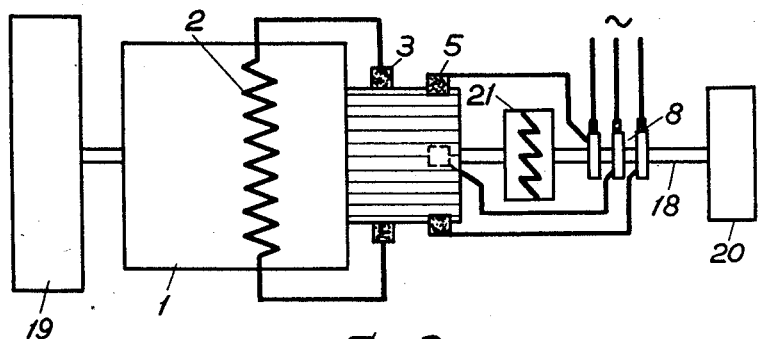
Figure 3:
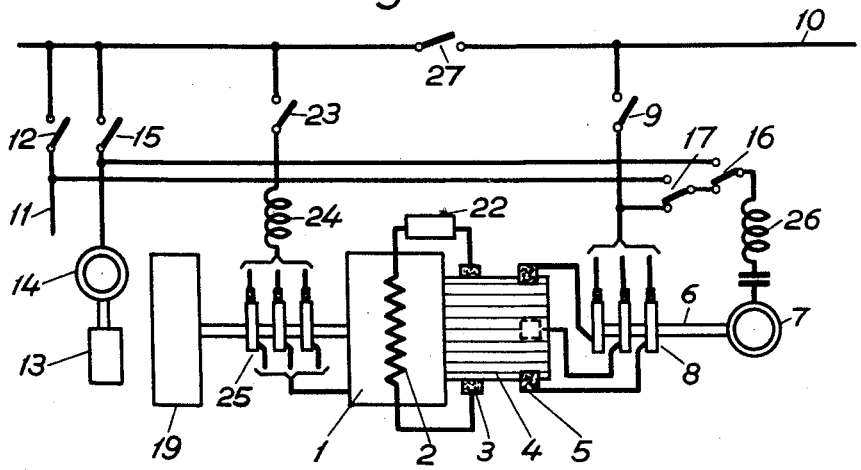
Figure 4:
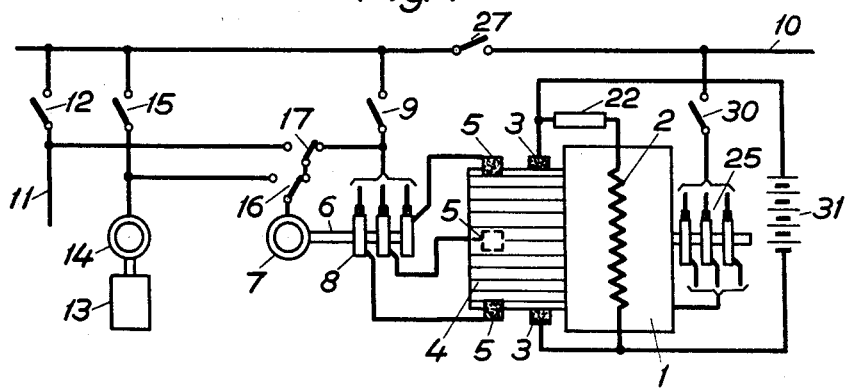
Figure 5:
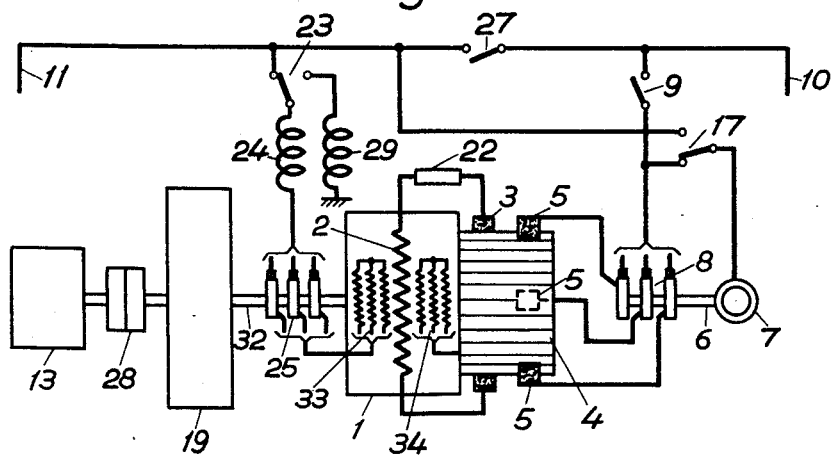

In the accompanying drawing Fig. 1 shows an arrangement according to the invention, where the network as well as the load are connected to the machine through the rotating brushes, which are driven by a synchronous machine, whereas Fig. 2 shows a modification, where said brushes are driven by a fly wheel, Fig. 3 shows a modified form in which the machine is connected to the network through slip rings, permanently connected to the armature winding, and to the load through the rotating brushes, whereas Fig. 4 shows an arrangement, where the machine is connected to the network through the rotating brushes and to the load through said slip rings, and Fig. 5 shows an arrangement where the machine is provided with two separate armature windings.

In Fig. 1, 1 designates an electric machine with a direct current wound armature. 2 designates the excitation winding of the machine, which is connected to the commutator 4 by stationary brushes 3. The shaft of the machine is coupled to a fly wheel 19. Against the commutator 4 there slides a set of brushes 5, which by means of a shaft 6 can be brought to rotate around the commutator 4 and then are driven by an electric synchronous motor 7. The brushes 5 are joined with slip rings 8 attached to the shaft 6, which brushes in their turn are connected to the load 10 through the switch 9. 11 designates the network which normally is connected to the load 10 through the switch 12. 13 is a driving motor, for instance a diesel motor, which is coupled to an alternating current generator 14, which can be connected to the load 10 through the switch 15. The driving synchronous motor 7 for the brushes 5 is at normal service connected to the slip rings 8 through the switches 16 and 17.

When a fault occurs on the network 11 so that the normal delivery of power ceases, the switch 12 is opened and the load 10 will in the first moment receive the necessary energy from the machine 1 through the slip rings 8 and the switch 9, which is closed. In spite of the fact that the speed of the machine 1 decreases to the same degree as the fly wheel 2 is discharged, the load 10, however, is supplied with a current having a constant voltage and frequency, due to the fact that the synchronous motor 7 is connected to the slip rings 8 over a member, not shown on the drawing, which gives the synchronous motor 7 a constant speed. Such a device may for instance consist of a tuned circuit. The voltage on the load is maintained by a voltage regulator which is inserted in the circuit of the excitation winding 2 and controls the excitation of the machine 1.

In the same moment as the network ceases to deliver energy to the station, the switch 12 is opened and the machine 13 receives a starting impulse, and when then the generator 14 driven by this machine has reached full speed and full voltage, the switch 16 is switched over to the generator 14, and now the slip rings 8 will rotate with the synchronous speed determined by the generator 14. When the voltage over the slip rings 8 is in phase with the voltage of the generator 14, the switch 15 is closed and the load 10 as well as the machine 1 will from then on receive the necessary energy from the generator 14.

When then the network 11 enters into function, the switch 15 is opened and the stand-by aggregate 13 and 14 is stopped. Then the machine 1 takes over the supply of power to the load. When the switch 15 is opened, also the switch 17 is reversed so that the synchronous motor 7 is connected directly to the network 11, and then the slip rings 8 and brushes 5 will rotate synchronously with the network 11, the switch 12 now being closed, and the network will take over again the delivery of energy to the load 10 and machine 1 and thus charge the fly wheel 19.

Fig. 3 shows a modified form of the invention, where the machine is connected to the network through slip rings permanently connected to the armature winding of the machine. As in the form above described, 1 designates an electric machine with a direct current wound armature. 2 designates the excitation winding of the machine, which is connected to the commutator 4 through stationary brushes 3 and a regulator 22. A set of brushes 5 bears against the commutator 4, and can be made to rotate around the commutator 4 by means of a shaft 6 driven by a synchronous motor 7. The brushes 5 are joined with slip rings 8 attached to the shaft 6, said slip rings being connected to the load 10 through a switch 9. An alternating current network 10 is normally connected to slip rings 25 through switches 12 and 23 and a reactance coil 24, said slip rings being fixed to the armature of the machine 1, in the same manner as in a rotatory converter. The machine 1 is provided with a fly wheel 19. 13 designates a prime mover for instance a diesel motor, which drives an alternating current generator 14 which, by means of a switch 15, can be connected to the slip rings 25 of the machine 1 in the same way as the network 11. The synchronous motor 7 is normally connected to the slip rings 8 through a tuned circuit 26, consisting of an inductance in series with a capacitance, but may, by means of switches 16 and 17, be connected to either the network 11 or the generator 14.

During normal service the switch 27 is open, and the network 11 is connected to the machine 1 through closed switches 12 and 23, the reactance coil 24 and the slip rings 25. The machine 1 is then driven from the network as a normal synchronous machine. The load 10 is connected to the machine 1 through the closed switch 9, the slip rings 8 and the rotating brushes 5. The synchronous motor 7 is connected to the slip rings 8 through the switches 16 and 17 and the tuned circuit 26, which causes the motor 7 to run with a substantially constant speed independently of variations in the load of the motor. Assuming, for example, that the motor 7 is running with its proper speed whereby the rotating brushes deliver a frequency which is identical with the resonance frequency of the tuned circuit 26; the terminal voltage of the motor 7 is thus in phase with the voltage at the rotating brushes 5 and the driving torque that the motor 7 exerts upon its shaft 6 and which is proportional to the phase angle between the terminal voltage and voltage induced by the armature poles, will be proportional to the phase angle between the voltage at the rotating brushes 5 and the induced voltage in the motor 7, which phase angle is accordingly fixed by the geometric angle between the armature poles and the rotating brushes. If the braking torque acting upon the shaft 6 is increased, for instance because of an increase of the friction between the rotating brushes 5 and the commutator 4, this will give the motor 7 a tendency to slow down, which causes a slight decrease of the frequency delivered by the brushes 5. Because of the lower frequency the impedance of the tuned circuit 26 will be capacitive, and the terminal voltage of the motor 7 will be leading in phase in relation to the voltage at the brushes 5, so that the phase angle between the terminal voltage and the induced voltage of the motor 7 increases, which results in the motor exerting an increasing driving torque and consequent gains in speed. The arrangement will function in the opposite way if the braking torque acting upon the shaft 6 decreases. It is also clear that instead of a tuned circuit consisting of an inductance in series with a capacitance, any suitable impedance means having a frequency dependent phase angle may be used.

The brushes 5 thus will rotate with substantially constant speed and thereby supply the load 10 with a current of constant frequency, independently of the speed of the machine 1, which is in accordance with the frequency of the network. The regulator 22 controls the excitation of the machine in accordance with the voltage changes in the network 11 in such a way that the voltage over the brushes 5 and over the load 10 is constant while the voltage drop is absorbed by the reactance coil 24. By means of the reactance coil 24 it is also possible, in the event of short circuits in the network 11, to maintain the voltage over the slip rings 25 and thus over the brushes 5 and the load 10 at a constant value, until the switch 23 interrupts the connection to the network 11.

When a fault occurs on the network 11, so that the normal delivery of power ceases, the switches 23 and 12 are opened, and the load 10 will in the first moment receive the necessary energy from the machine 1 through the slip rings 8 and the switch 9. Although the speed of the machine 1 decreases as the fly wheel 19 slows down, the load is supplied with a current having constant frequency, due to the fact that the motor 7 by means of the tuned circuit 26 is caused to rotate the brushes 5 with constant speed. The voltage over the load 10 is kept constant by means of the regulator 22 inserted in the excitation circuit of the machine 1. Simultaneously with the disconnection of the network 11 the prime mover 13 receives a starting impulse, and when the generator 14 driven by the prime mover has reached full speed and full voltage, the switch 16 is switched over to the generator 14, and now the slip rings 8 will rotate with the synchronous speed determined by the generator 14. When the voltage over the slip rings 8 is in phase with the voltage of the generator 14, the switches 15 and 27 are closed, and the machine 1 will be driven from the stand-by generator 14 through the switches 15, 27, 9, the slip rings 8 and the rotating brushes 5. The speed of the machine 1 is then controlled by the regulator 22 in such a way that the frequency over the slip rings 25 becomes synchronous with the frequency of the generator 14, after which the switch 23 is closed, the switch 27 is opened and the switch 16 is switched over to the slip rings 8, so that the machine 1 is driven from the generator 14 in the same way as it is normally driven from the network 11.

When the network 11 again enters into function, the switch 17 connects the synchronous motor 7 to the network, by which the slip rings 8 and the brushes 5 will rotate synchronously with the network 11, after which the switches 15 and 23 are opened and the switches 12 and 27 are closed, so that the machine 1 is driven from the network 11 through the rotating brushes 5, the slip rings 8 and the switches 9, 27 and 12. The speed of the machine 1 is then controlled by the regulator 22 in such a way that the frequency over the slip rings 25 becomes synchronous with the frequency of the network 11, after which the switch 23 is closed, the switch 27 is opened and the switch 17 is again switched over to the slip rings 8, so that the machine is driven as normal again from the network 11.

The arrangement shown in Fig. 2 shows another way of driving the rotating brushes 5. The arrangement is chiefly characterised in that the brushes 5 are driven by a shaft 18, provided with a fly whele 20 and coupled to the shaft of the machine by means of a coupling 21. The coupling 21 is so designed that it is only capable of transferring torque from the machine 1 to the rotating brushes 5. With this arrangement the frequency over the load 10 during normal service is entirely determined by the speed of the machine 1, that is by the frequency of the network 11. When the instantaneously acting stand-by power plant is serving as an energy source, that is when the fly wheel 19 delivers energy, the rotating brushes 5 will, however, be driven by the fly wheel 20 and thus rotate with substantially constant speed independently of the variation of the speed of the machine 1.

Fig. 4 shows a modified form of the invention, where the machine is connected to the network through the rotating brushes and to the load through slip rings permanently connected to the armature winding, and where the machine is provided with a storage battery connected to stationary brushes bearing against the commutator. This arrangement operates in substantially the same way as the arrangement shown in Fig. 3. During normal service the switch 27 is open and the network 11 is connected to the machine 1 through the switches 12 and 9, the slip rings 8 and the brushes 5. The synchronous motor 7 is connected to the slip rings 8 through the switches 16 and 17 and thus rotates with a speed determined by the frequency of the network. The machine 1 is consequently driven from the network 11 and rotates with a speed determined by the excitation which is controlled by the regulator 22 in such a way that the speed and therefore the frequency over the slip rings 25 and the load 10, which is connected to the slip rings 25 through a switch 30, is kept constant. Simultaneously as the network 11 delivers energy to the load 10 it also charges the storage battery 31 which is connected to the stationary brushes 3.

When a fault occurs on the network 11, the switch 12 is opened, and the machine 1 and the load 10 receive in the first moment the necessary energy from the storage battery 31, and the machine continues to rotate with a speed kept constant by the regulator 22. At the same time the prime mover 13 is started and when the generator 14 has reached full speed the synchronous motor 7 is connected to the generator 14 by means of the switch 16 so that the slip rings 8 will rotate synchronously with the generator 14. When the voltages of the generator 14 and over the slip rings 8 are in phase the switch 15 is closed so that the machine 1 and the load 10 receive the necessary energy from the generator 14. Simultaneously the switch 16 returns to its former position.

When the network 11 again enters into function the switch 15 is opened and the stand-by aggregate 13 and 14 is stopped and the storage battery 31 once again takes over the delivery of energy to the machine 1 and the load 10. At the same time the synchronous motor 7 is connected to the network 11 by means of the switch 17 and when the voltages over the slip rings 8 and of the network 11 are in phase the switch 12 is closed so that the machine 1 and the load 10 once again are fed from the network. Simultaneously the switch 17 returns to its former position.

Fig. 5 shows an arrangement which is substantially identical with the arrangement shown in Fig. 3. The arrangement in Fig. 5, however, comprises instead of an electric stand-by aggregate only a prime mover 13, which, when a fault occurs on the network 11 and the machine 1 is disconnected from the network 11, is started and coupled mechanically to the machine 1 by means of a coupling 28, so that the machine 1 is driven by the prime mover 13. The arrangement further comprises an earthing reactor 29 to which the slip rings 25 are connected by means of the switch 23, when the upon faults on the network are disconnected from the network, so that a neutral point is provided even when the network 11 is disconnected.

In the arrangements shown in Figs. 3, 4 and 5 the machine 1 may be provided with two separate armature windings 33 and 34, as indicated in Fig. 5, one of them connected to the slip rings 25 and the other one to the commutator 4, so that the loads 10 and 11 are isolated from one another.

I claim as my invention:

1. An instantaneous stand-by aggregate for the supply of emergency energy to an alternating current load upon failure of an alternating current network normally supplying energy for said load, having an electric machine comprising a direct current wound armature, direct current excitation means, a set of brushes sliding against the commutator, a separate driving arrangement causing the said set to rotate in relation to the commutator, means connecting the load permanently to the machine, and means whereby the machine is normally connected to and driven from the network.

2. An arrangement according to claim 1, comprising slip rings permanently connected to the armature winding, means connecting said slip rings to the network, and means connecting the load with the said brushes.

3. An arrangement according to claim 1, comprising means connecting the network as well as the load to the machine through the said brushes.

4. An arrangement according to claim 1, comprising slip rings permanently connected to the armature winding, means connecting said slip rings to the load, and means connecting the network with said brushes.

5. An arrangement according to claim 2, the machine comprising two separate armature windings, one of them connected to said slip rings and the other one to the commutator.

6. An arrangement according to claim 1, comprising a fly wheel operating in the machine.

7. An arrangement according to claim 1, comprising a storage battery and a pair of stationary brushes bearing against the commutator, said storage battery being connected to said stationary brushes.

8. An arrangement according to claim 1, comprising a standby electric generator, a prime mover driving said generator, and means for connecting, when a fault occurs on the network, the machine to said generator.

9. An arrangement according to claim 1, comprising a prime mover and means for coupling mechanically, when a fault occurs on the network, the machine to said prime mover.

10. An arrangement according to claim 1, comprising an inductance, and means connecting the machine to the network through said inductance.

11. An arrangement according to claim 9, comprising earthing reactors and means for disconnecting the machine from the network, when a fault occurs on it, and connecting it to said earthing reactors.

12. An arrangement according to claim 1, comprising a synchronous motor driving the rotary brushes, and a tuned circuit connecting the said motor with the brushes.

13. An arrangement according to claim 12, comprising a stand-by electric generator, a prime mover driving the said generator, and means temporarily connecting the motor to the network and to the generator for the purpose of synchronising.

14. An arrangement according to claim 1, comprising a bridge to which the said brushes are fixed, a fly wheel for the bridge, and a coupling so connecting the bridge to the armature that torque may be transferred only from the armature to the brushes.

References Cited in the file of this patent

UNITED STATES PATENTS

| | | |
|---|---|---|
| 479,951 | Marvin | Aug. 2, 1892 |
| 522,241 | Thomson | July 3, 1894 |
| 2,345,805 | Gibson | Apr. 4, 1944 |
| 2,783,393 | Lindahl et al. | Feb. 26, 1957 |